United States Patent
Sah et al.

(10) Patent No.: US 7,170,572 B2
(45) Date of Patent: Jan. 30, 2007

(54) TRANSFLECTIVE THIN FILM TRANSISTOR LIQUID CRYSTAL DISPLAY PANEL AND MANUFACTURING METHOD THEREOF

(75) Inventors: Wen-Jyh Sah, Tainan County (TW); Chung-Kuang Wei, Kaohsiung County (TW); Cheng-Jen Chu, Ilan (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 75 days.

(21) Appl. No.: 10/750,360

(22) Filed: Dec. 31, 2003

(65) Prior Publication Data

US 2004/0179156 A1    Sep. 16, 2004

(30) Foreign Application Priority Data

Jan. 2, 2003    (TW) ............................... 92100063 A

(51) Int. Cl.
G02F 1/1335    (2006.01)
(52) U.S. Cl. ..................................................... 349/114
(58) Field of Classification Search ............ 349/42–44, 349/113–114, 187
See application file for complete search history.

(56) References Cited

U.S. PATENT DOCUMENTS 6,078,366 A * 6/2000 Dohjo et al. .................. 349/43
6,809,785 B2 * 10/2004 Fujino ......................... 349/114
6,937,304 B2 * 8/2005 Ha et al. ...................... 349/114

* cited by examiner

Primary Examiner—James A. Dudek
(74) Attorney, Agent, or Firm—Thomas, Kayden, Horstemeyer & Risley

(57) ABSTRACT

The invention provides a manufacturing process of transflective TFT-LCD panel (transflective TFT-LCD panel) comprising the following steps: first, form a first conductive layer on the substrate; next, define the first conductive layer to form a gate; after that, form a dielectric layer on the gate; following that, form a channel over the gate; then, form a photo-resist block; form a second conductive layer; next, define the second conductive to form a source and a drain over the gate, and to form a photo-reflective layer on the photo-resist block; after that, form a protection layer thereon; following that, define the protection layer to form a first opening on the photo-reflective layer allowing part of the drain to be exposed, and to form a second opening on the photo-reflective layer allowing part of the photo-reflective layer to be exposed; last, form a transparent electrode being electrically connected to the drain and the photo-reflective layer via the first and the second opening respectively.

10 Claims, 4 Drawing Sheets

TRANSFLECTIVE THIN FILM TRANSISTOR LIQUID CRYSTAL DISPLAY PANEL AND MANUFACTURING METHOD THEREOF

This application claims the benefit of Taiwan application Ser. No. 092100063, filed Jan. 02, 2003.

BACKGROUND OF THE INVENTION

1. Field of the Invention

The invention relates in general to a thin film transistor liquid crystal display panel (TFT-LCD panel), and more particularly to a transflective thin film transistor liquid crystal display panel (transflective TFT-LCD panel).

2. Description of the Related Art

Along with the rapid advance in technology, the role that reflective TFT-LCD panel and transflective TFT-LCD panel has played in the market has become ever more important. In the industry of telecommunication, the transflective TFT-LCD panel can be applied to the display screen of a mobile phone, allowing the users to clearly read their display screens whatever the illumination is dark at a chamber or extreme bright in the open air.

The manufacturing process of a conventional reflective liquid crystal display panel is shown in FIG. 1A to FIG. 1F. First of all, a glass substrate 100 is provided with a first metal layer being formed thereon, wherein the first metal layer is patterned, and a gate 105 of thin film transistor and a capacitor electrode 110 of storage capacitance by means of micro-filming and etching techniques.

Please refer to FIG. 1B. Following the formation of the gate 105 and the capacitor electrode 110, a dielectric layer 115 will be applied thereon. Following that, a layer of amorphous Si is formed over the gate 105; meanwhile, a channel 120 is formed through the manufacturing process of photolithography and etching.

Please refer to FIG. 1C. A second metal layer is formed on the channel 120 and the dielectric layer 115; meanwhile, after patterning the second metal layer through the manufacturing process of micro-film and etching, a source 125 and a drain 130 will be formed thereon.

Please refer to FIG. 1D. A protection layer 135 is formed on the source 125 and the drain 130, then a photo-resist layer 140 covers on the protection layer 135. Following that, part of the photo-resist layer 140 will be removed through the manufacturing process of photolithography and etching.

Please refer to FIG. 1E. After high-temperature treatment, pail of the surface of the photo-resist layer 140 will undulate. After that, another photo-resist layer 145 will be formed on the photo-resist layer 140, meanwhile, a via hole 148 will be formed through the manufacturing process of photolithography and etching, such that pad of the drain 130 will be exposed.

Please refer to FIG. 1F. At last, a third metal layer is formed on the photo-resist layer 145, then a photo-reflective layer 150 will be formed by patterning the third metal layer through the manufacturing process of photolithography and etching, wherein the photo-reflective layer 150 is electrically connected to the drain 130 via the via hole 148.

During the manufacturing process of the conventional reflective TFT-LCD panel, an individual mask is needed for the respective formation of the gate 105 and the capacitor electrode 110, of the channel 120, of the source 125 and the drain 130, of the photo-resist layer 140, of the via hole 148, and of the photo-reflective layer 150. Totally, 6 masks are needed. Considering the peripheral wiring for the liquid crystal display panel, the number of masks required would amount to 8.

In terms of the conventional reflective TFT-LCD panel, an opening needs to be formed on the photo-reflective layer 150 wherein the opening is covered with a transparent electrode. In doing so, another mask will be needed. Owing to the many masks required, the manufacturing cost of the conventional transflective TFT-LCD panel could hardly be reduced.

SUMMARY OF THE INVENTION

It is therefore an object of the invention to provide a transflective TFT-LCD panel and the manufacturing process thereof, aiming to reduce the number of masks required during the manufacturing process and to effectively cut down the cost.

According to the abovementioned object, a transflective TFT-LCD panel and the manufacturing process thereof is provided in the present invention whose steps are disclosed below. First, form a first conductive layer on the substrate; next, define the first conductive layer to form a gate; after that, form a dielectric layer on the gate; following that, form a channel over the gate; then, form a photo-resist block; form a second conductive layer; next, define the second conductive to form a source and a drain over the gate, and to form a photo-reflective layer on the photo-resist block, wherein the photo-reflective layer and the drain are discrete; after that, form a protection layer thereon; following that, define the protection layer to form a first opening on the photo-reflective layer allowing part of the drain to be exposed, and to form a second opening on the photo-reflective layer allowing part of the photo-reflective layer to be exposed; last, form a transparent electrode, and the drain and the photo-reflective layer are electrically connected via the transparent electrode through the first opening and the second opening respectively.

It is therefore another object of the invention to provide a transflective TFT-LCD panel. Equipped with both a transmissive area and a reflective area, the liquid crystal display panel further comprises a substrate, a thin film transistor, a dielectric layer, a photo-resist block, a photo-reflective layer, and a transparent electrode. The thin film transistor having a source, a drain and a gate is formed on the substrate; the dielectric layer is used to cover the gate; the photo-resist block is formed on the dielectric layer; the photo-reflective layer, which is located within the reflective area, is formed on the photo-resist block, wherein the photo-reflective layer and the drain are discrete; the transparent electrode, formed substantially within the transmissive area. The photo-reflective layer is electrically connected to the drain via the transparent electrode.

Other objects, features, and advantages of the invention will become apparent from the following detailed description of the preferred but non-limiting embodiments. The following description is made with reference to the accompanying drawings.

DETAILED DESCRIPTION OF THE INVENTION

The spirit of the present invention resides in forming a photo-reflective layer on a second metal layer omitting the formation of a third metal layer. Since the third metal layer is omitted, the number of masks required according to the invention is reduced, cutting manufacturing cost down.

Figure 1A:
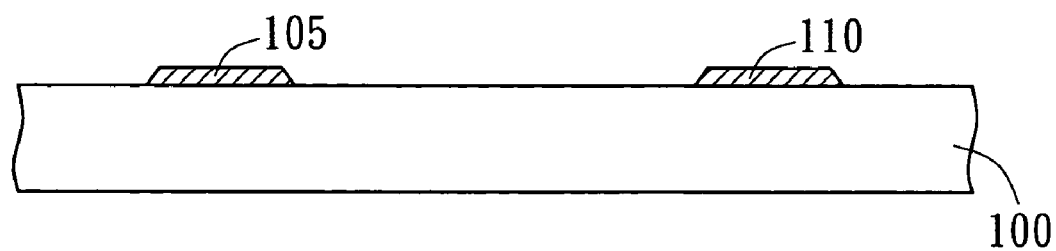
FIGS. 1A~1F are diagrams illustrating the manufacturing process of a conventional reflective TFT-LCD panel.
Figure 1B:
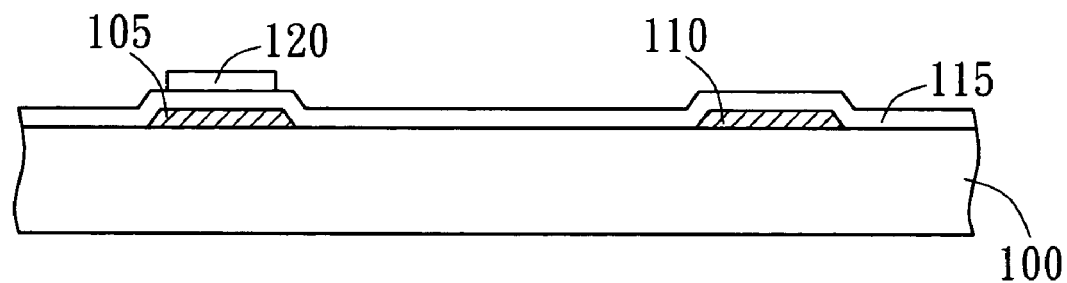
Figure 1C:
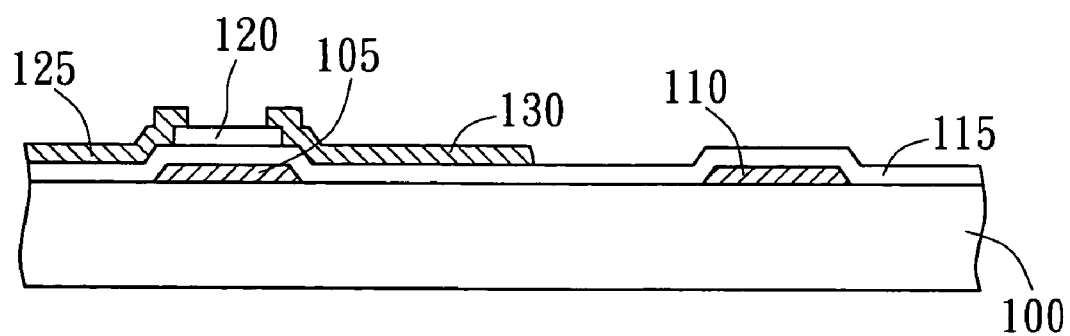
Figure 1D:
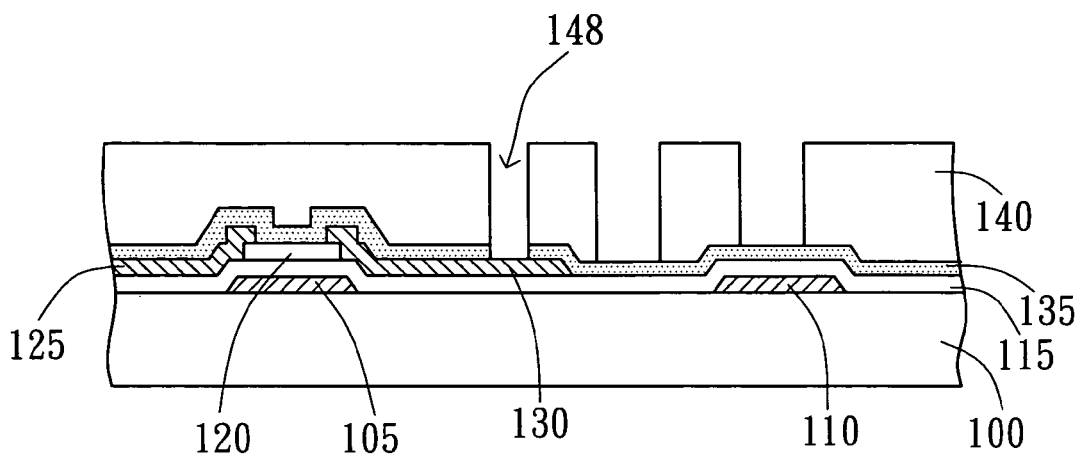
Figure 1E:
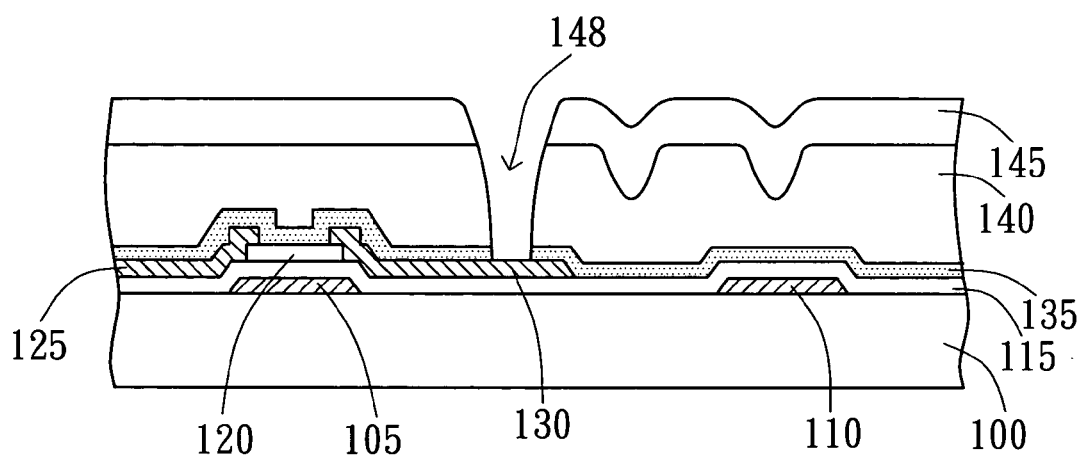
Figure 1F:
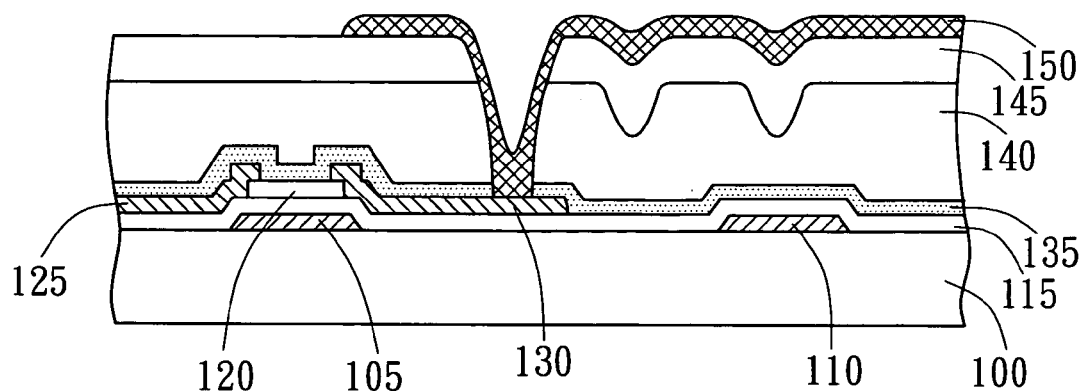
Figure 2A:
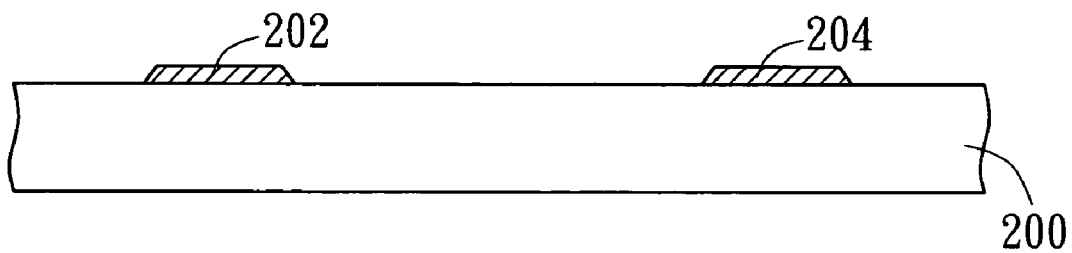
FIGS. 2A~2F are diagrams illustrating the manufacturing process of a transflective TFT-LCD panel according to the invention.

The manufacturing process of the transflective TFT-LCD panel according to the invention is disclosed in FIG. 2A~2F. First, as shown in FIG. 2A, a glass substrate 200 is provided with a first metal layer being formed thereon; by patterning the first metal layer through the manufacturing process of photolithography and etching, a gate 202 of the thin film transistor and a capacitor electrode 204 of the storage capacitor will be formed.

Figure 2B:
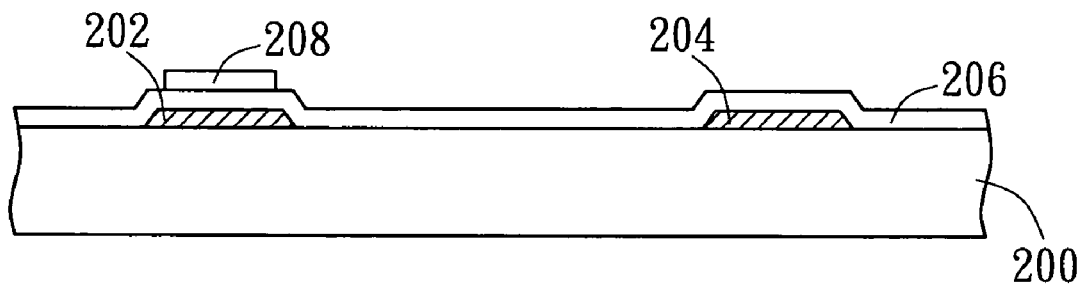

Next, as shown in FIG. 2B, following the formation of the gate 202 and the capacitor electrode 204, a dielectric layer 206 is applied thereon. Then, a layer of amorphous Si is formed; a channel 208 will be formed over the gate 202 through the manufacturing process of photolithography and etching.

Figure 2C:
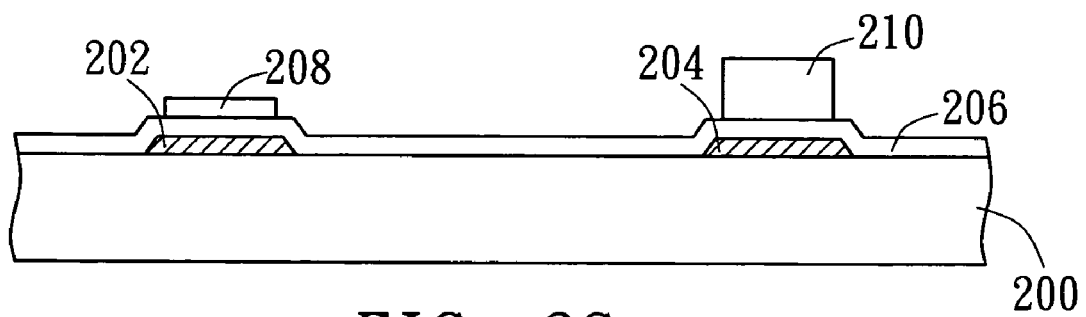

After that, as shown in FIG. 2C, a photo-resist layer is formed. By patterning the photo-resist layer through the manufacturing process of photolithography and etching, a photo-resist block 210 located on the capacitor electrode 204 will be obtained. The photo-resist layer can be composed of positive photo-resist.

Figure 2D:
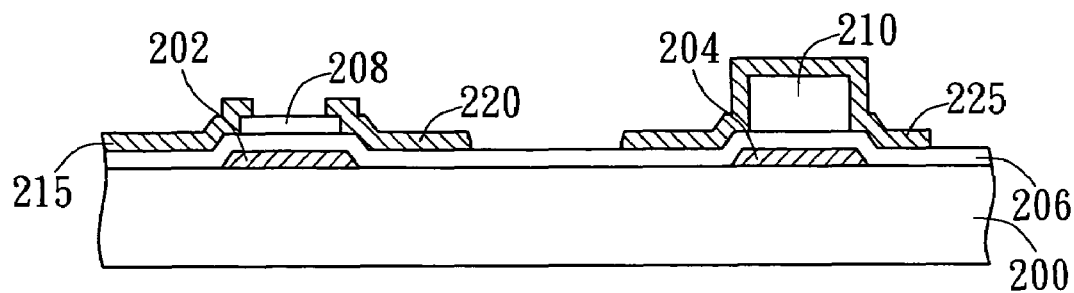

Next, as shown in FIG. 2D, a second metal layer 208 is formed on the channel 208 and on the photo-resist block 210; by patterning the second metal layer through the manufacturing process of photolithography and etching, a photo-reflective layer 225, a source 215 and a drain 220 will be formed simultaneously on the photo-resist block 210.

Figure 2E:
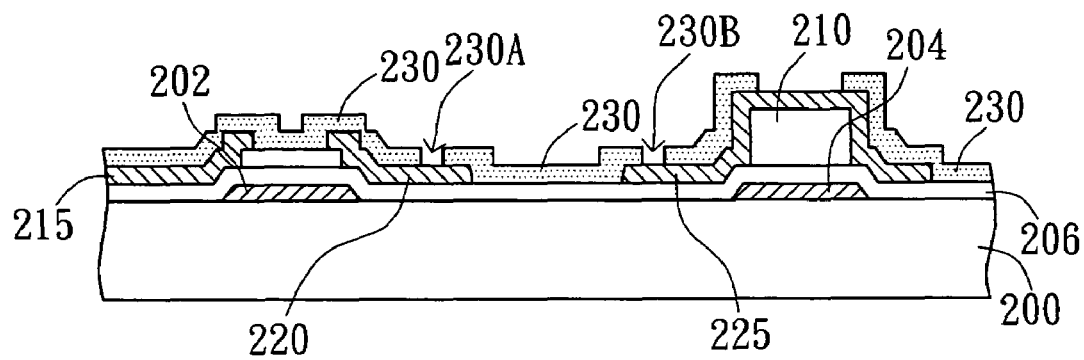

After that, as shown in FIG. 2E, a protection layer 230 is formed. Through the manufacturing process of photolithography and etching, a first opening 230A and a second opening 230B are formed thereon allowing part of the drain 220 and part of the photo-reflective layer 225 to be exposed.

Figure 2F:
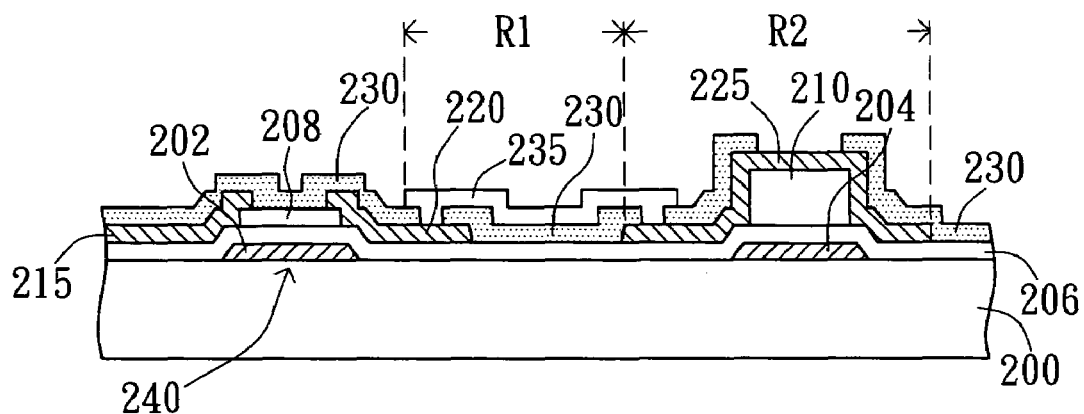

Last, as shown in FIG. 2F, the protection layer 230 will be covered with a transparent electrode 235 composed of indium-tin oxide (ITO), wherein the transparent electrode makes the drain 220 and the photo-reflective layer 225 become electrically connected via the first opening 230A and the second opening 230B.

In the present embodiment, the photo-resist block 210 is situated exactly on the capacitor electrode 204 while the photo-reflective layer 225 is substantially formed above the capacitor electrode 204, giving a maximum aperture ration for the TFT-LCD panel according to the invention. It is to be understood that the invention is not to be limited to the above layout: the photo-reflective layer 225 can also be formed at somewhere else but the source 215 and the drain 220.

Please refer to FIG. 2F again. The transflective TFT-LCD panel formed through the manufacturing method according to the invention has a transmissive area R1 and a reflective area R2. The gate 202, the channel 208, the source 215 and the drain 220 together form a thin film transistor 240. The transparent electrode 235 is formed within the transmissive area R1 and is electrically connected to the drain 220. The photo-reflective layer 225 is located within the reflective area R2. It is noted that the photo-reflective layer 225 and the drain 220 are discrete (FIG. 2F), and the photo-reflective layer 225 is electrically connected to the drain 220 by the transparent electrode 235.

The feature of the invention resides in that the photo-reflective layer 225 within the reflective area R2 and the source 215 and the drain 220 of the thin film transistor, by means of a second metal layer, are formed simultaneously. Since the photo-reflective layer 225 is electrically connected to the drain 220, it is know by people skilled in the applied transflective TFT-LCD panel. Also, the photo-reflective layer 225 and the drain 220 are discrete, and the photo reflective layer 225 is electrically connected to the drain 220 by the transparent electrode 235. Compared with the conventional manufacturing process which requires a third metal layer, the manufacturing process according to the present invention does not need to have the third metal layer hence reducing the number of masks needed. Moreover, the manufacturing process according to the present invention is more simplified than that of the conventional one.

In the embodiment of the present invention, only five masks are needed. During the manufacturing process of the transflective TFT-LCD panel according to the invention, only one mask is required for each of the following formations, i.e., the formation of the gate 202 and the capacitor electrode 204, the formation of the channel 208, the formation of the source 215, the drain 130 and the photo-reflective layer 225, the formation of the photo-resist block 210, and the formation of the protection layer. Totally, five masks are needed. Compared with the conventional method, the present invention has indeed simplified the manufacturing process and reduced manufacturing cost accordingly.

The transflective TFT-LCD panel disclosed in the above embodiment according to the present invention can reduce the number of masks required cutting down manufacturing cost further.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A manufacturing method of a transflective TFT-LCD panel, comprising the steps of:

A manufacturing method of a transflective TFT-LCD panel, comprising the steps of:

forming a first conductive layer on a substrate;

patterning the first conductive layer to form a gate;

forming a dielectric layer on the substrate to cover the gate;

forming a channel on the dielectric layer and the channel disposed over the gate;

forming a photo-resist block;

forming a second conductive layer to cover the channel and the photo-resist block;

patterning the second conductive layer to form a source, a drain and a reflective pixel electrode simultaneously, wherein the source and the drain are disposed above the gate, and the reflective pixel electrode is formed on the photo-resist block, and the reflective pixel electrode and the drain are discrete;

forming a protection layer to cover the source, the drain and the reflective pixel electrode;

patterning the protection layer to form a first opening on the drain allowing part of the drain to be exposed, and a second opening on the reflective pixel electrode allowing part of the reflective pixel electrode to be exposed; and forming a transparent electrode electrically connected to the drain and the reflective pixel electrode via the first opening and the second opening.

2. A manufacturing method according to claim 1, wherein a capacitor electrode set under the photo-resist block is formed during the step of defining the first conductive layer.

3. A manufacturing method according to claim 1, wherein the first conductive layer is a first metal layer.

4. A manufacturing method according to claim 1, wherein the substrate is a glass substrate.

5. A manufacturing method according to claim 1, wherein the photo-resist block is composed of positive photo-resist.

6. A manufacturing method according to claim 1, wherein the second conductive layer is a second metal layer.

7. A manufacturing method according to claim 1, wherein the transparent electrode is composed of indium-tin oxide (ITO).

8. A manufacturing method of a transflective TFT-LCD panel equipped with a transmissive area and a reflective area, comprising the steps of:

forming a thin film transistor and a capacitor electrode on the substrate, wherein a reflective pixel electrode within the reflective area and a source and a drain of the thin film transistor are formed simultaneously, and the reflective pixel electrode and the drain are discrete; and forming a transparent electrode within the transmissive area to electrically connect the reflective pixel electrode and the drain.

9. A manufacturing method according to claim 8, wherein the reflective pixel electrode is formed substantially above the capacitor electrode.

10. A manufacturing method according to claim 8, wherein a photo-resist block is formed on the capacitor electrode prior to the formation of the reflective pixel electrode.

* * * * *